(12) United States Patent
Danhof et al.

(10) Patent No.: US 12,065,289 B2
(45) Date of Patent: Aug. 20, 2024

(54) CONTAINER SYSTEM AND METHOD

(71) Applicant: Ring Container Technologies, LLC, Oakland, TN (US)

(72) Inventors: Matthew James Danhof, Knoxville, TN (US); Scott James Glassbrook, Howell, MI (US); Jason Raymond Paris, San Bernardino, CA (US)

(73) Assignee: Ring Container Technologies, LLC, Oakland, TN (US)

( * ) Notice: Subject to any disclaimer, the term of this patent is extended or adjusted under 35 U.S.C. 154(b) by 76 days.

(21) Appl. No.: 17/989,772

(22) Filed: Nov. 18, 2022

(65) Prior Publication Data

US 2024/0166410 A1 May 23, 2024

(51) Int. Cl.
*B65D 43/02* (2006.01)
*B29D 22/00* (2006.01)
*B65D 1/02* (2006.01)
*B65D 51/16* (2006.01)

(52) U.S. Cl.
CPC ....... *B65D 43/0237* (2013.01); *B29D 22/003* (2013.01); *B65D 1/0246* (2013.01); *B65D 51/1622* (2013.01); *B65D 2205/00* (2013.01); *B65D 2401/35* (2020.05)

(58) Field of Classification Search
CPC .......... B65D 41/62; B65D 43/0237; B65D 43/0235; B65D 51/1622; B65D 51/1605; B65D 51/16; B65D 1/0246; B65D 1/023; B65D 1/0223; B65D 2401/35; B65D 2401/15; B65D 2205/00; B29D 22/003
USPC ..... 220/366.1, 214, 266, 265; 215/206, 253, 215/250, 225, 224, 45, 43
See application file for complete search history.

(56) References Cited

U.S. PATENT DOCUMENTS

| | | | | |
|---|---|---|---|---|
| 4,573,599 A | * | 3/1986 | Fillmore | B65D 41/48 |
| | | | | 215/256 |
| 4,934,547 A | * | 6/1990 | Mayes | A61B 10/007 |
| | | | | 215/250 |

* cited by examiner

*Primary Examiner* — Robert J Hicks
(74) *Attorney, Agent, or Firm* — Sorell, Lenna & Schmidt, LLP

(57) ABSTRACT

A packaging container is provided. The packaging container includes a body defining a volume. The body including a neck extending from an opening of the body. The neck including a proximal surface and a circumferential projection defining at least one gap. The neck further including at least one axial support disposed in the gap. A closure is engageable with the proximal surface, and a sleeve is conformable to an outer surface of the closure and the neck. In some embodiments, container systems and methods of manufacturing containers are disclosed.

20 Claims, 14 Drawing Sheets

CONTAINER SYSTEM AND METHOD

TECHNICAL FIELD

The present disclosure generally relates to packaging containers and more particularly to plastic containers, and methods for making the same for food packaging.

BACKGROUND

Plastic blow-molded containers are commonly used for food packaging products. Many food and beverage products are sold to the consuming public in blow-molded containers. These containers can be made from polyethylene terephythalate or other suitable plastic resins in a range of sizes. The empty blow-molded containers can be filled with food and/or beverage products at a fill site utilizing automated fill equipment.

For example, manufacture of such plastic blow-molded containers can include initially forming plastic resin into a preform, which may be provided by injection molding. Typically, the preform includes a mouth and a generally tubular body that terminates in a closed end. Prior to being formed into containers, preforms are softened and transferred into a mold cavity configured in the shape of a selected container. In the mold cavity, the preforms are blow-molded or stretch blow-molded and expanded into the selected container.

These food packaging containers are adapted to store food packaging products, however, during manufacturing and depending on the type of food being stored in the container, the container may need to be vented. For example, a container can be vented as a safety feature so that gas from an inside of the container is released into the atmosphere prior to a lid being removed from the container. A container can also be vented to facilitate the escape of steam from the inside of the container and into the atmosphere when the container is filled with a hot product during manufacture. Such food packaging containers may also include tamper evidence as part of the packaging, for example, a tab, sleeve or band disposed adjacent an opening of the container. This disclosure describes an improvement over these prior technologies.

SUMMARY

In one embodiment, a packaging container includes a body defining a volume. The body including a neck extending from an opening of the body. The neck including a proximal surface and a circumferential projection defining at least one gap. The neck further including at least one axial support disposed in the gap. A closure is engageable with the proximal surface, and a sleeve is conformable to an outer surface of the closure and the neck. In some embodiments, container systems and methods of manufacturing containers are disclosed.

In one embodiment, a blow molded packaging container is provided. The blow molded packaging container includes a body defining a volume. The body includes a neck extending from an opening of the body. The neck includes a proximal surface and a horizontal circumferential projection defining at least one gap. The neck further including at least one vertical axial support disposed in the gap. A snap closure is engageable with the proximal surface, and a tamper evidence sleeve is conformable to an outer surface of the closure and the neck.

In one embodiment, a method for manufacturing a packaging container is provided. The method comprising the steps of: blow molding an article having a selected configuration and including a body defining a volume, a neck and a dome, the neck including a proximal surface and a circumferential projection defining at least one gap, the neck further including at least one axial support disposed in the gap; trimming the article to remove the dome to form a finished container; attaching a closure to the proximal surface; and attaching a sleeve to an outer surface of the closure and the neck.

BRIEF DESCRIPTION OF THE DRAWINGS

The present disclosure will become more readily apparent from the specific description accompanied by the following drawings, in which.

DETAILED DESCRIPTION

Figure 1:
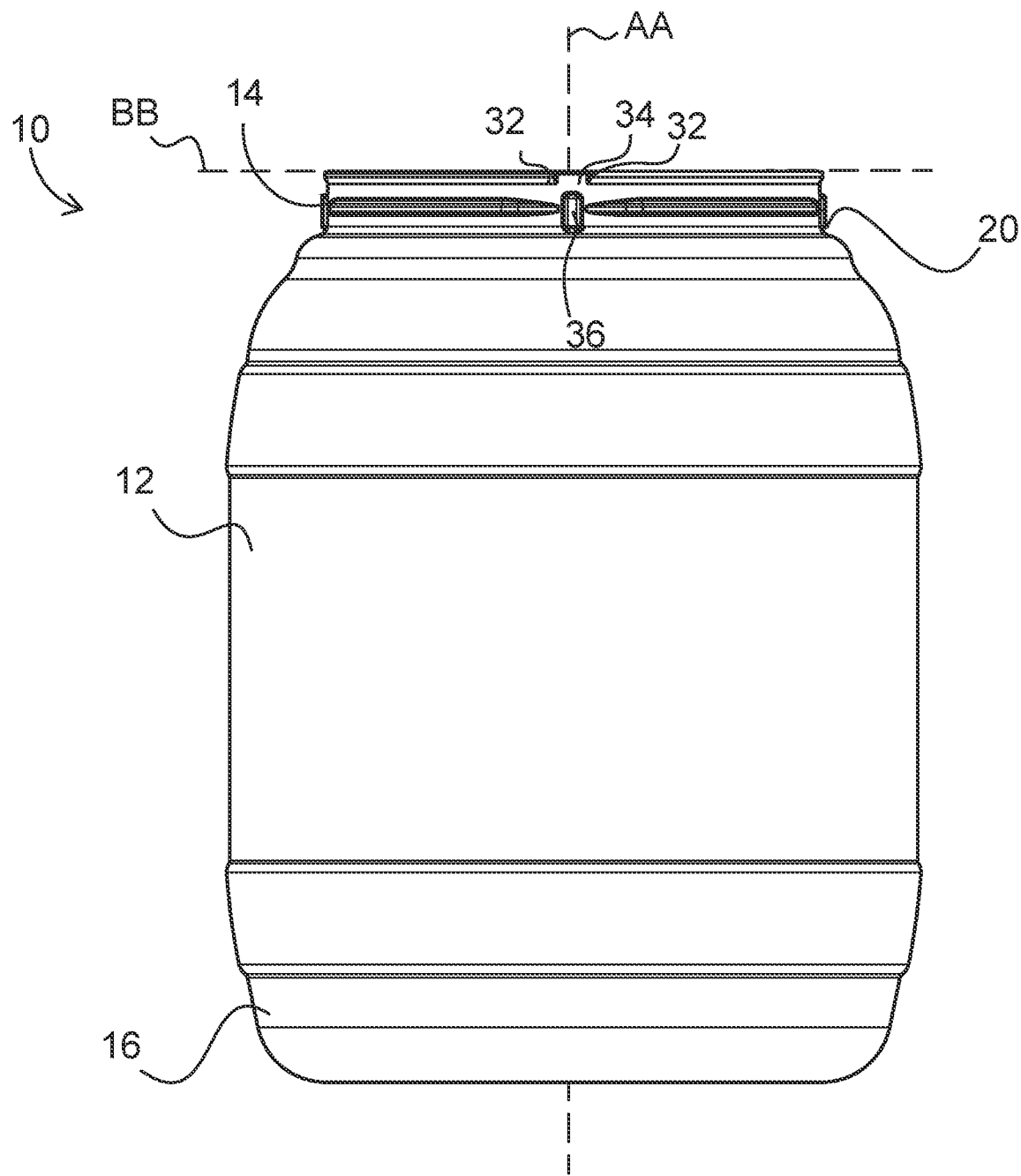
FIG. 1 is a side view of one embodiment of a container system in accordance with the principles of the present disclosure.

The exemplary embodiments of blow-molded containers and more particularly, polyethylene terephythalate (PET) containers and methods for making the same are discussed in terms of food packaging products. In some embodiments, the present container includes a neck including at least one vent configured to contact with a tamper evidence sleeve, for example, a shrink band such that the container is breathable. In some embodiments, the depth of the vent is configured to prevent the shrink band from sealing against the neck at points corresponding to the vent and neck.

In some embodiments, the present container includes a neck defining at least one vent. In some embodiments, a tamper evidence sleeve, for example, a shrink band is configured to engage with the neck of the container. In some embodiments, the at least one vent is configured to provide a venting pathway when the container is engaged with the shrink band. In some embodiments, the at least one vent is defined from a projection defining at least one gap and at least one axial support disposed in the gap. In some embodiments, the shrink band is configured to retain a closure, for example, a snap bead closure with the container. In some embodiments, the at least one vent facilitates venting of the container when the shrink band tightly engages with the container. In some embodiments, engagement of the support with the shrink band prevents the shrink band from breaking, thereby preventing the shrink band from indicating that the contents of the container have been tampered.

In some embodiments, the components of the at least one vent of the present container are formed within a neck of the container. In some embodiments, the at least one axial support includes a plurality of supports that create a venting path for gases under the shrink band. In some embodiments, a venting path is created in a container that does not include the shrink band. In some embodiments, the plurality of supports facilitate gas exchange between air inside of the container and air outside of the container, for example, the atmosphere, in a consistent manner to account for temperature and altitude changes such that pressure is equalized between the container and the air outside of the container. In some embodiments, the plurality of supports are configured to maintain a pressure differential between the inside of the container and the outside of the container. In some embodiments, the plurality of supports increase vent performance.

In some embodiments, the present container includes at least one vent including a projection defining at least one gap and at least one axial support disposed in the gap. In some embodiments, the at least one vent is disposed in and/or around a neck of the container such that a shrink band is prevented from fully sealing around the neck. In some embodiments, components of the vent contact portions of a bottom of a closure, for example, a lid, such that a surface between a top of the neck of the container and the closure form a less positive seal to increase vent performance of the container. In some embodiments, the container includes a single vertical support at each base ring on a neck of the container. In some embodiments, the container includes a 160 millimeter (mm) neck, the support includes a 1.875 mm depth, a 5.5 mm width and a 10.75 mm height, beginning 7.5 mm down from the sealing surface.

In some embodiments, the neck includes a base including at least one vent including at least one support disposed at a snap bead/base ring to form a less positive seal with the lid such that a desired amount of venting can occur. In some embodiments, the at least one support includes a single vertical support per snap bead/base ring. In some embodiments, the at least one support includes two vertical supports per snap bead/base ring. In some embodiments, the at least one support includes a depth that protrudes from a neck diameter in a range of 0.5 mm to 5 mm. In some embodiments, the depth of the at least one support is dependent on the diameter of the neck. In some embodiments, the depth of the at least one support is configured to prevent the shrink band from sealing against the neck at points corresponding to the at least one support and the neck. In some embodiments, the at least one support includes a selected width that facilitates mold release during manufacture. In some embodiments, the at least one support includes a width in a range of 1 mm to 10 mm. In some embodiments, the width of the at least one support is greater than the depth. In some embodiments, the at least one support is dimensioned to facilitate the container from being released from a mold during manufacture. In some embodiments, the at least one support includes a maximum width that is narrower than a width that would facilitate the shrink band to seal against the neck and the at least one support. In some embodiments, the at least one support includes a height in a range from 2 mm to 15 mm. In some embodiments, the height is dependent on the selected design of the container and a height of the neck of the container.

In some embodiments, the present container is manufactured via a single stage injection mold to form a container with a finish snap closure. In some embodiments, the method includes secondary processing of the container to form the at least one vent including the at least one support on the neck of the container.

In some embodiments, the present disclosure includes a container that is employed with a method for manufacturing food packaging having the ability to produce food packages made from PET with minimal weight and selectively desirable physical performance features, as described herein.

The present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. In some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of components of a blow molded container and methods of manufacturing a packaging container. Alternate embodiments are also disclosed. Reference is made in detail to the exemplary embodiments of the present disclosure, which are illustrated in the accompanying figures. Turning to FIGS. 1-10, there are illustrated components of a blow molded container 10.

Container 10 is configured for storing products such as food, food preparation, beverages and/or other consumer products including, but not limited to peanut butter, pretzels and/or cheeseballs. Container 10 includes a body 12 that extends from an end 14 to an end 16, and defines a longitudinal axis AA, as shown in FIG. 1. Body 12 includes a circumferential side wall 18 that extends between ends 14, 16. A volume is defined from body 12. Body 12 includes a substantially cylindrical configuration. In some embodiments, body 12 may include various configurations, for example, oval, oblong, triangular, square, polygonal, irregular, uniform, non-uniform, offset, staggered, and/or tapered. Body 12 may be manufactured by blow molding techniques, as described herein. In some embodiments, body 12 includes one or a plurality of walls.

Figure 2:
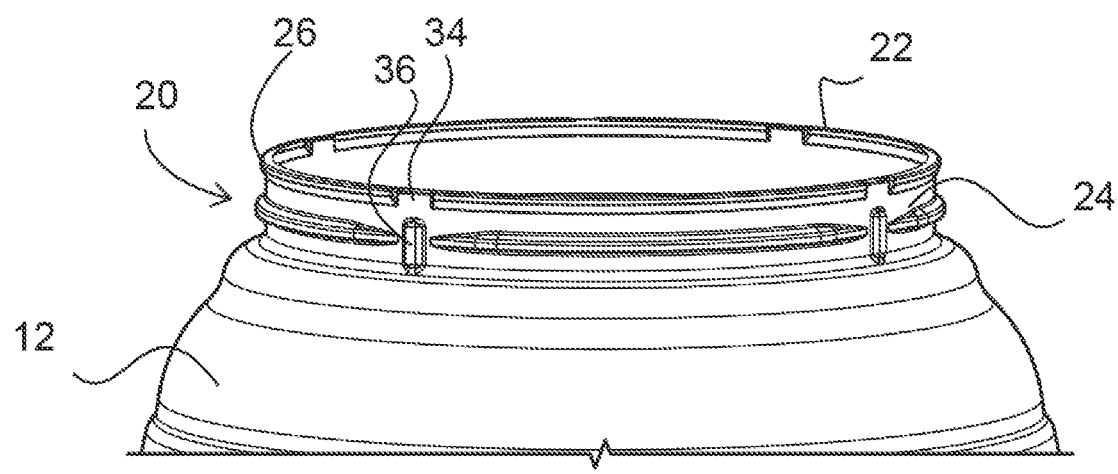
FIG. 2 is a break away perspective view of components of the container system shown in FIG. 1.

End 14 includes a surface that defines a neck 20, as shown in FIGS. 1 and 2. Neck 20 is centrally disposed relative to body 12 and includes a cylindrical neck configuration. In some embodiments, neck 20 is offset relative to body 12. In some embodiments, neck 20 may include various configurations, for example, oval, oblong, triangular, square, polygonal, irregular, uniform, non-uniform, offset, staggered, and/or tapered. In some embodiments, neck 20 can include various surface configurations including smooth, rough, textured, porous, semi-porous, dimpled, knurled, toothed, raised, grooved and/or polished.

Neck 20 includes a sealing surface 22 and a neck finish 24, as shown in FIG. 2. Sealing surface 22 includes a circumferential lip 26 extending from an opening of neck 20. Sealing surface 22 is configured for engagement with a closure, for example, a snap lid 28, as described herein. In some embodiments, sealing surface 22 can include various surface configurations including smooth, rough, textured, porous, semi-porous, dimpled, knurled, toothed, raised, grooved and/or polished.

Figure 3:
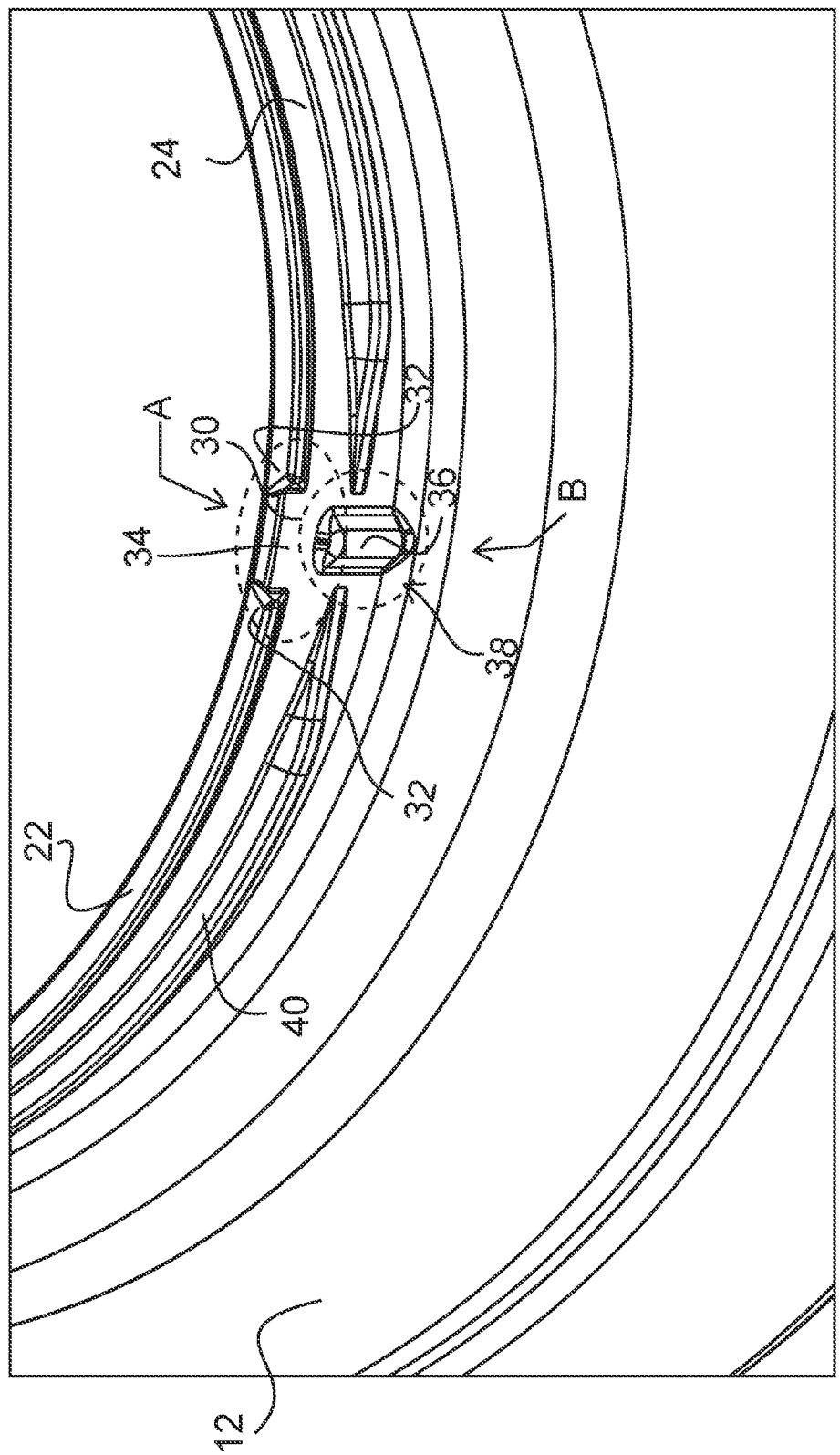
FIG. 3 is a break away perspective view of components of the container system shown in FIG. 1.

Neck 20 includes a proximal surface 30. Lid 28 is configured for engagement in a snap configuration with proximal surface 30. Neck 20 includes a circumferential projection 32 defining a gap 34, as shown in FIG. 3. Projection 32 includes a horizontal projection. Projection 32 is disposed on a transverse axis BB relative to longitudinal axis AA of body 12, as shown in FIG. 1. In some embodiments, projection 32 includes a plurality of gaps 34 disposed about projection 32.

Neck 20 includes an axial support 36 disposed in gap 34, as shown in FIG. 3. Projection 32, gap 34 and support 36 are configured to form a vent 38 such that when a sleeve, for example, a shrink band 42 engages and conforms to an outer surface of lid 28 and neck 20, container 10 can vent, as described herein. In some embodiments, support 36 is disposed in gap 34 and is disposed in an interruption of a snap bead/base ring 40 of neck finish 24 such that vent 38 forms a less positive seal with lid 28 to facilitate a desired amount of venting.

In some embodiments, support 36 can include various surface configurations including smooth, rough, textured, porous, semi-porous, dimpled, knurled, toothed, raised, grooved and/or polished. In some embodiments, gap 34 may include various configurations, for example, oval, oblong, triangular, square, polygonal, irregular, uniform, non-uniform, offset, staggered, and/or tapered.

Figure 4:
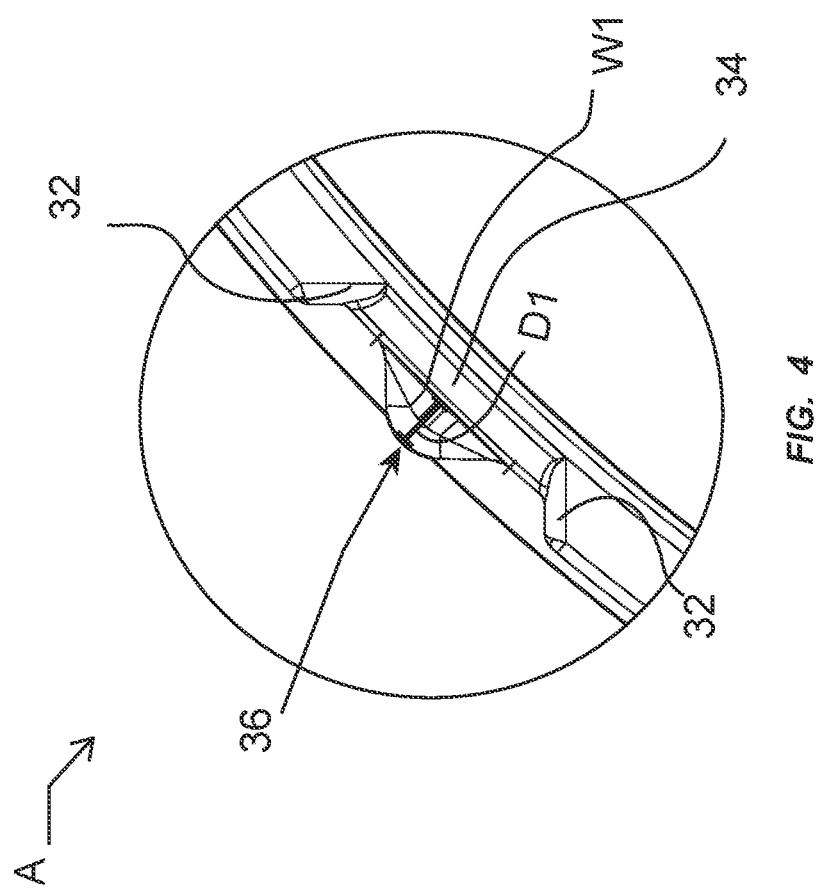
FIG. 4 is an enlarged view of detail A shown in FIG. 3.
Figure 5:
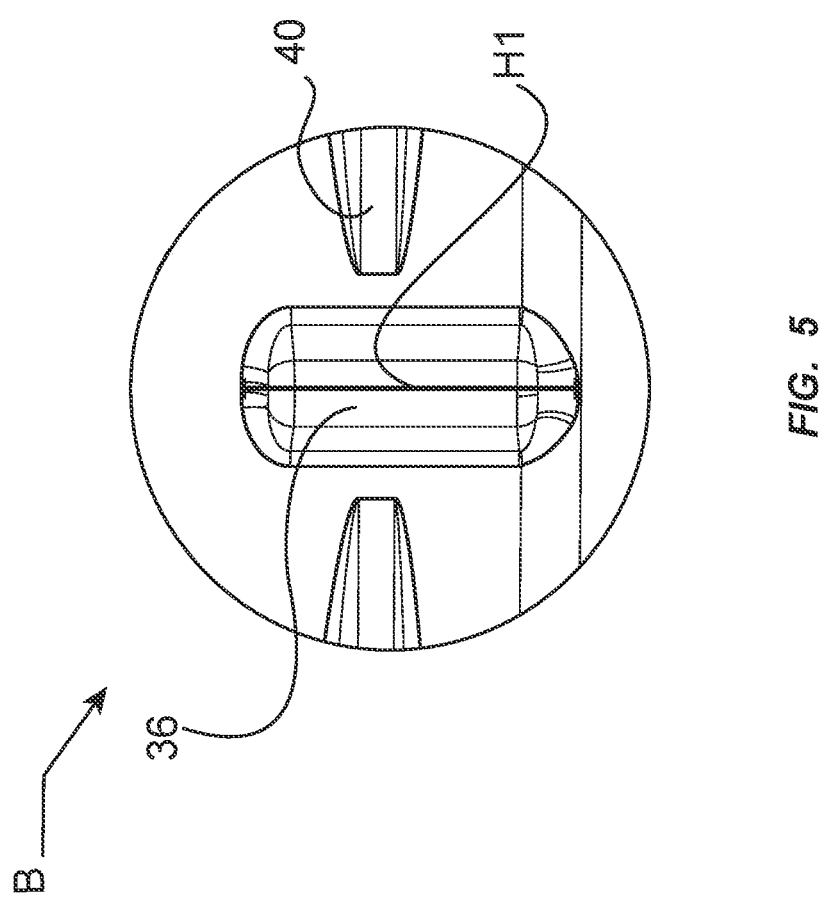
FIG. 5 is an enlarged view of detail B shown in FIG. 3.
Figure 6:
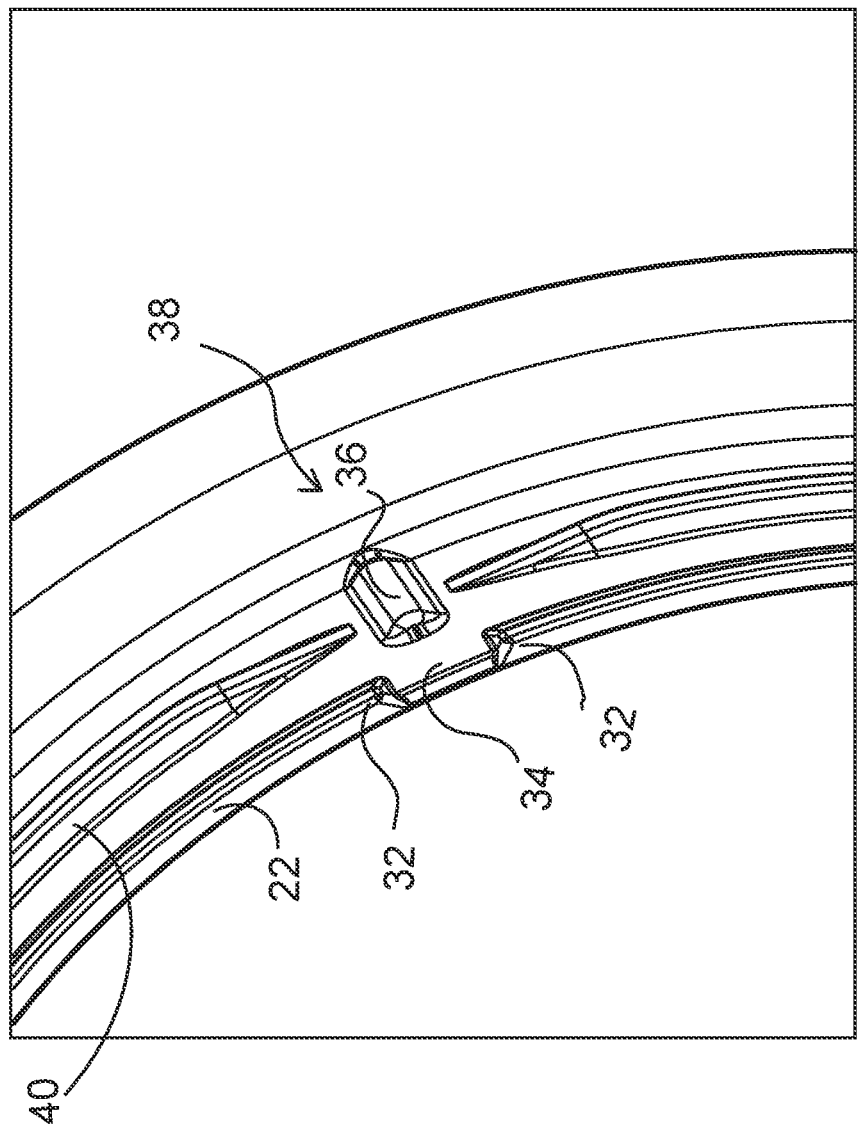
FIG. 6 is a break away perspective view of components of the container system shown in FIG. 1.

Support 36 includes a vertical support. Support 36 is disposed on longitudinal axis AA relative to body 12. Support 36 includes a depth D1, as shown in FIG. 4. The depth D1 of support 36 is configured to prevent shrink band 42 from sealing against neck 20 at locations corresponding to support 36 and neck 20. In some embodiments, depth D1 is in a range of 0.5 mm to 5 mm. Support 36 includes a width W1, as shown in FIG. 4. In some embodiments, the width W1 is in a range of 1 mm to 10 mm. In some embodiments, the width W1 of support 36 is greater than the depth D1. Support 36 includes a height H1, as shown in FIG. 5. In some embodiments, the height H1 is in a range of 2 mm to 15 mm. In some embodiments, the height H1 is selected based on a selected design and a selected height of neck 20.

In some embodiments, container includes a 160 millimeter (mm) neck 20, support 36 includes a 1.875 mm depth, a 5.5 mm width and a 10.75 mm height, beginning 7.5 mm down from sealing surface 22.

Support 36 includes a wedge shape. In some embodiments, the shape of support 36 may include various configurations, for example, oval, oblong, triangular, square, polygonal, irregular, uniform, non-uniform, offset, staggered, and/or tapered. In some embodiments, support 36 may be disposed at alternate orientations, relative to gap 34, for example, parallel, transverse and/or angular orientations such as acute or obtuse, coaxial and/or may be offset or staggered. In some embodiments, container 10 includes a plurality of supports 36 disposed within a plurality of gaps 34 disposed about projection 32.

As described above, vent 38 is formed from projection 32, gap 34 and support 36, and is configured to facilitate gas exchange between air disposed within an interior volume of container 10 and air, for example, atmosphere, in an exterior environment outside of container 10 in a consistent manner to account for temperature and altitude changes such that pressure is equalized between container 10 and the air in the exterior environment outside of container 10. In some embodiments, a vacuum is formed between the exterior environment and into the interior volume of container 10 and vent 38 equalizes the pressure between the exterior environment and the interior volume of container 10. In some embodiments, vent 38 is configured to eliminate a pressure differential between the interior volume of container 10 and the exterior environment of container 10. In some embodiments, vent 38 is configured to facilitate consistent venting of container 10 with or without the application of shrink band 42. In some embodiments, vent 38 facilitates a consistent pathway for gas to persist under shrink band 42 and prevents shrink band 42 from fully sealing to a surface of lid 28 and neck 20. In some embodiments, container 10 includes a plurality of vents 38.

Figure 8:
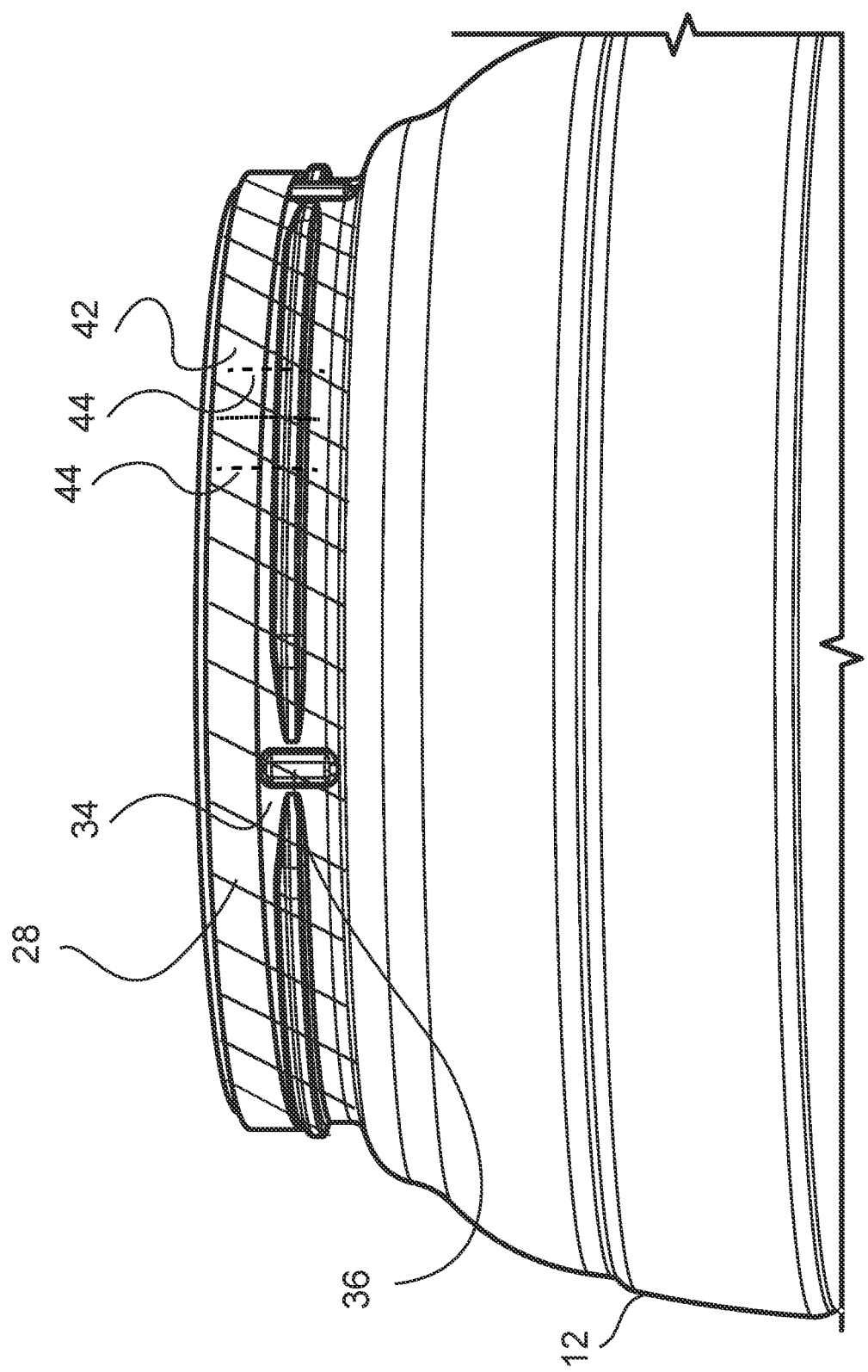
FIG. 8 is a break away perspective view of components of the container system shown in FIG. 1.
Figure 9:
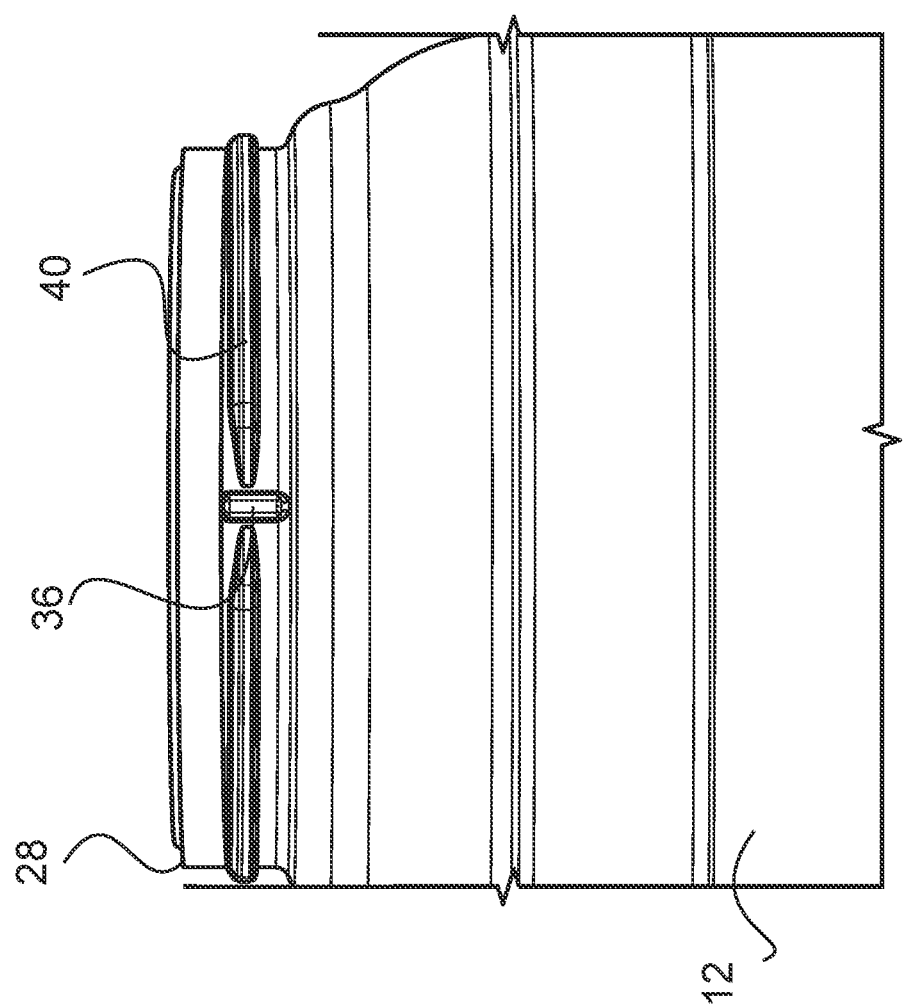
FIG. 9 is a break away perspective view of components of the container system shown in FIG. 1.
Figure 10:
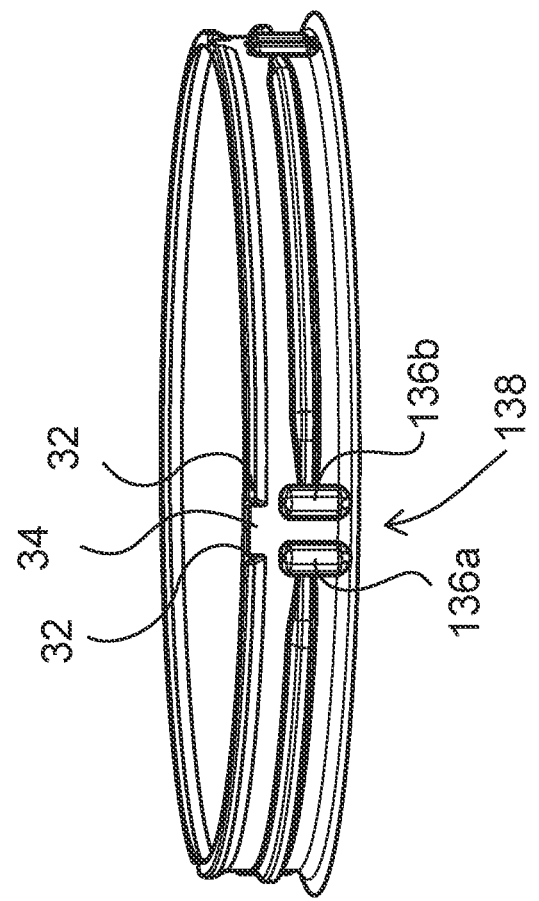
FIG. 10 is a break away perspective view of one embodiment of a container system in accordance with the principles of the present disclosure.
Figure 11:
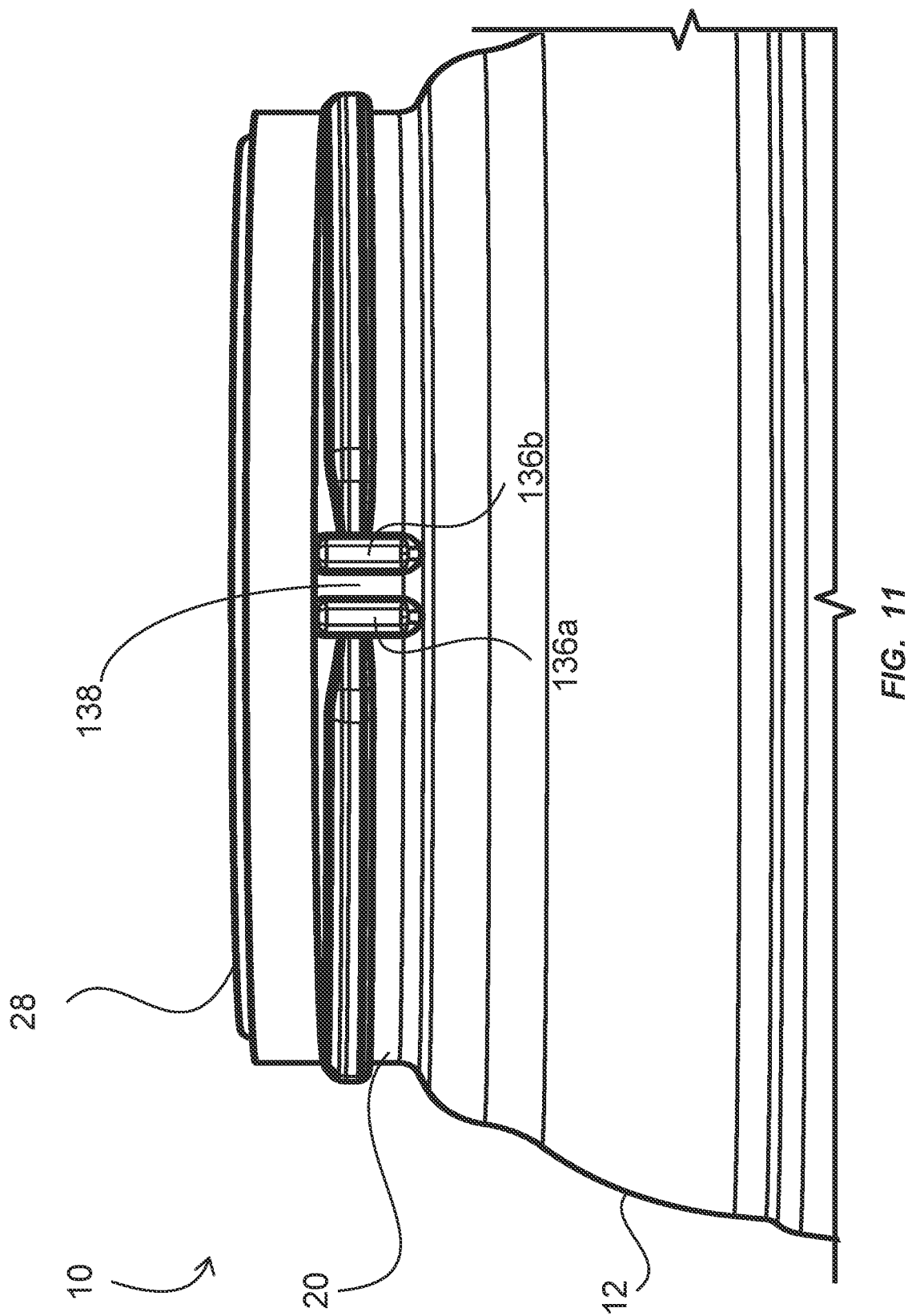
FIG. 11 is a break away perspective view of components of the container system shown in FIG. 10.
Figure 12:
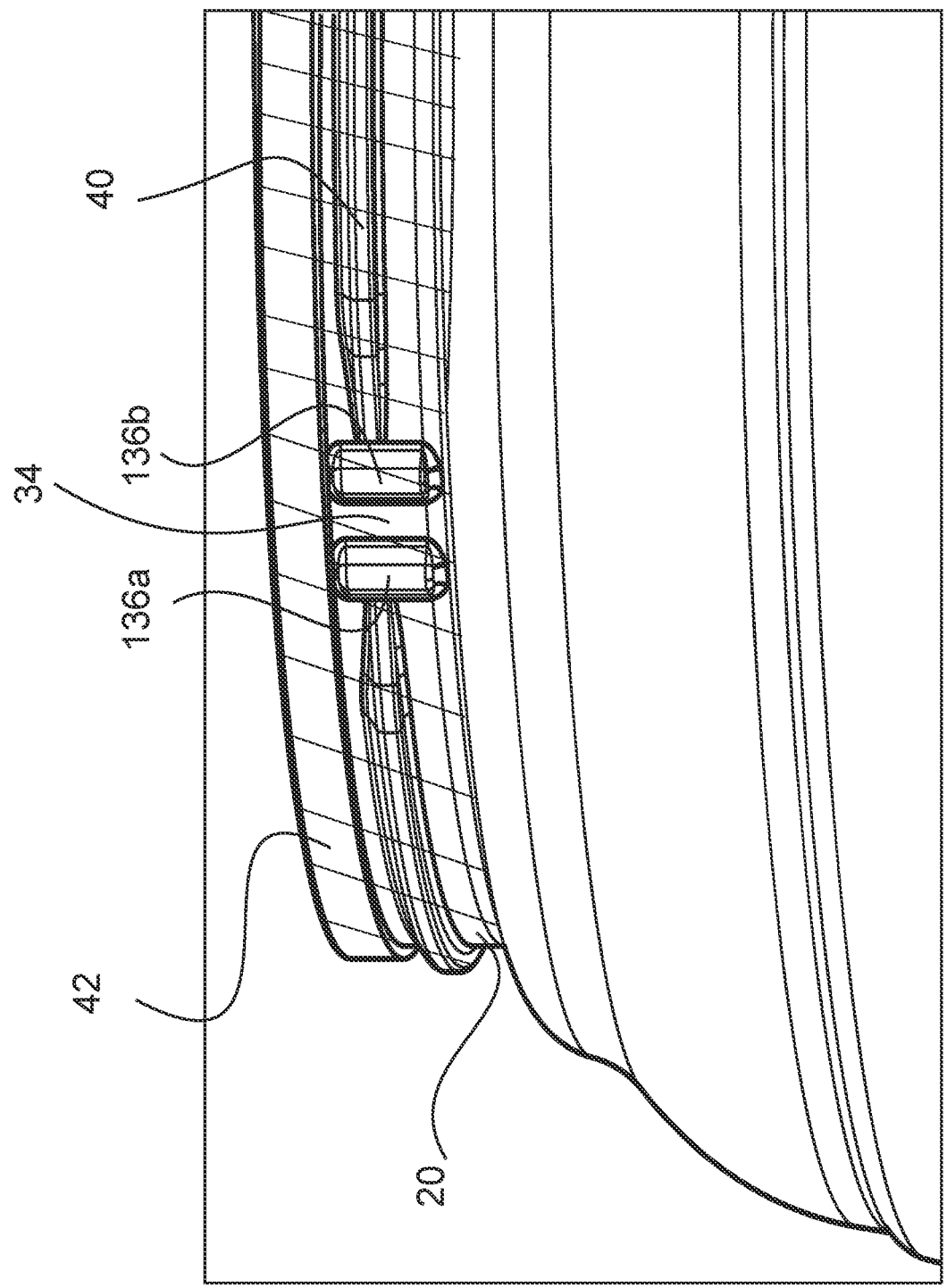
FIG. 12 is a break away perspective view of components of the container system shown in FIG. 10.
Figure 13:
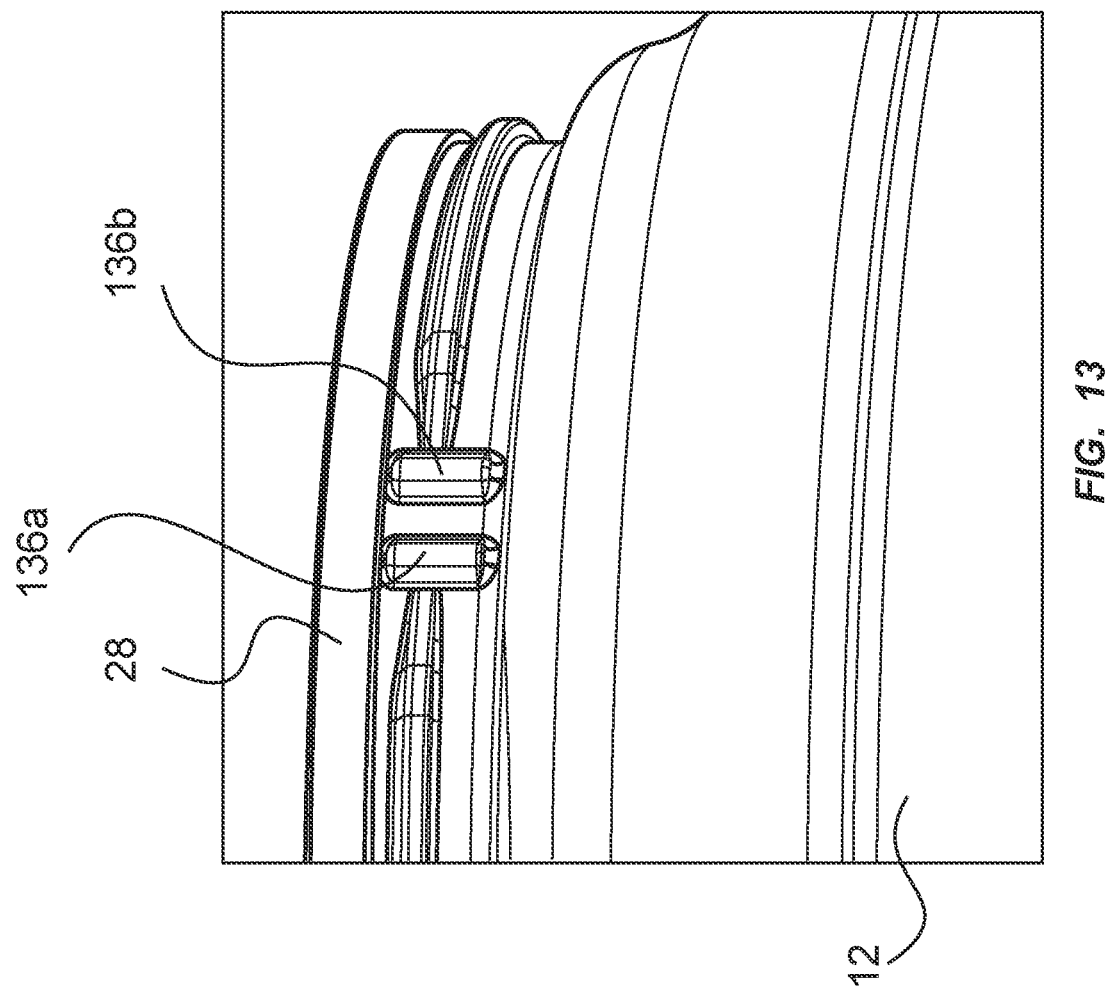
FIG. 13 is a break away perspective view of components of the container system shown in FIG. 10.
Figure 14:
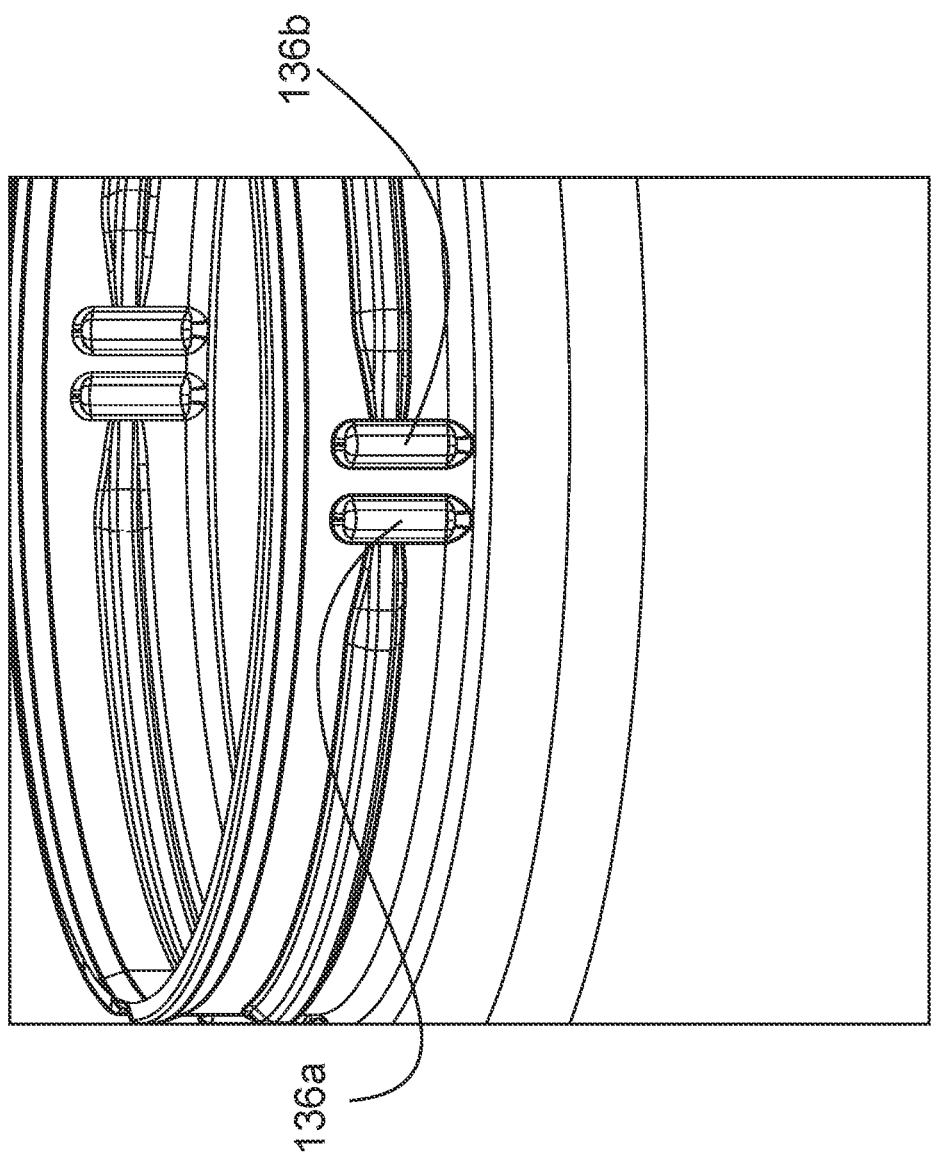
FIG. 14 is a break away perspective view of components of the container system shown in FIG. 10.

Shrink band 42 is conformable to an outer surface of lid 28 and neck 20 to retain lid 28 with container 10, as shown in FIG. 8. Shrink band 42 includes indicia, for example, a plurality of perforations 44. Perforations 44 are configured as a tamper evidence feature. In some embodiments, intact/undamaged perforations 44 visually indicate to a consumer that container 10 has not been tampered with. In some embodiments, torn/damaged perforations 44 indicate to a consumer that container 10 has been tampered with.

In some embodiments, shrink band 42 is disposed with the outer surface of lid 28 and neck 20 to conform shrink band 42 to the outer surface of lid 28 and neck 20. In some embodiments, shrink band 42 may be made of a heat shrinkable material. In some embodiments, shrink band 42 may be made of a compressible material. In some embodiments, shrink band 42 may be made of a stretchable or deformable material. In some embodiments, shrink band 42 can be made of materials including, but not limited to polyvinyl chloride (PVC), Fluoropolymer, Polyolefin, Polyester, PVDF, low density polyethylene (HDPE), FEP, PEBA, and/or low density polyethylene (LDPE).

Figure 7:
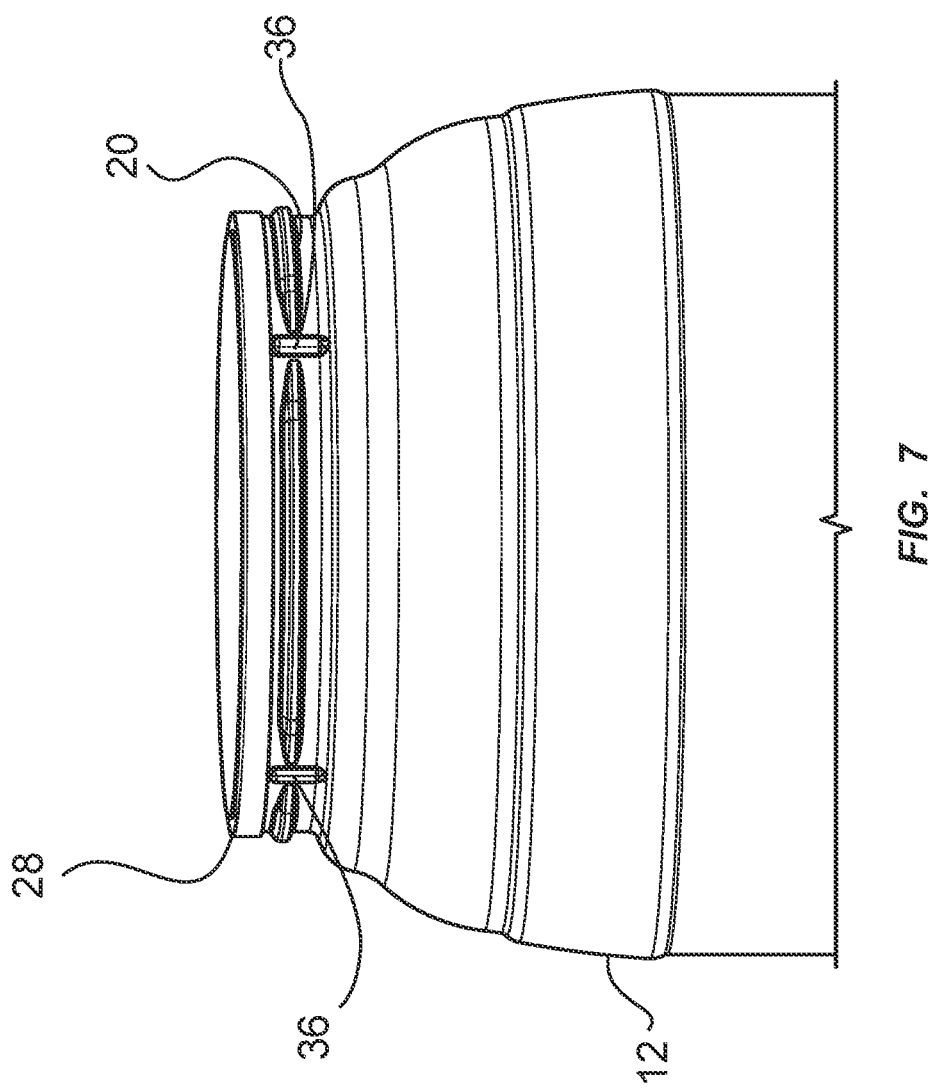
FIG. 7 is a break away perspective view of components of the container system shown in FIG. 1.

As described herein, lid 28 is engageable with neck 20 in a snap configuration, as shown in FIG. 7, and neck 20 includes snap bead/base ring 40. Snap bead/base ring 40 is disposed about a diameter of neck finish 24. In some embodiments, snap bead/base ring 40 is configured for engagement with a thread (not shown) of lid 28. In some embodiments, thread of lid 28 includes a plurality of threads. In some embodiments, snap bead/base ring 40 and/or thread of lid 28 may include various configurations, for example, non-angled, irregular, uniform, non-uniform, offset, staggered, and/or tapered.

Container 10 is made from PET. In some embodiments, container 10 may be fabricated from plastic. In some embodiments, container 10 may be fabricated from polyester (PES), polyethylene (PE), high-density polyethylene (HDPE), PVC, polyvinylidene chloride (PVDC) (Saran), low-density polyethylene (LDPE), polypropylene (PP), polystyrene (PS), high impact polystyrene (HIPS), polyamides (PA) (Nylons), acrylonitrile butadiene styrene (ABS), polyethylene/acrylonitrile butadiene styrene (PE/ABS), polycarbonate (PC), polycarbonate/acrylonitrile butadiene styrene (PC/ABS), and/or polyurethanes (PU). In some embodiments, container 10, as described herein, can be fabricated from materials suitable for food packaging products. In some embodiments, such materials include synthetic polymers such as thermoplastics, semi-rigid and rigid materials, elastomers, fabric and/or their composites.

In one embodiment, as shown in FIGS. 10-14, container 10 includes a first axial support 136a and a second axial support 136b, similar to support 36, described herein. Projection 32, gap 34 and supports 136a, 136b are configured to form a vent 138, similar to vent 38, described herein, such that when shrink band 42 engages and conforms to an outer surface of lid 28 and neck 20, container 10 can vent, as described herein. Supports 136a, 136b include vertical supports. Supports 136a, 136b are disposed on longitudinal axis AA relative to body 12. In some embodiments, supports 136a, 136b can include various surface configurations including smooth, rough, textured, porous, semi-porous, dimpled, knurled, toothed, raised, grooved and/or polished.

Supports 136a, 136b include a wedge shape. In some embodiments, the shape of supports 136a, 136b may include various configurations, for example, oval, oblong, triangular, square, polygonal, irregular, uniform, non-uniform, offset, staggered, and/or tapered. In some embodiments, supports 136a, 136b may be disposed at alternate orientations, relative to gap 34, for example, parallel, transverse and/or angular orientations such as acute or obtuse, coaxial and/or may be offset or staggered.

A finished PET blow-molded, container 10 is manufactured for use with a selected application, as described herein. In some embodiments, the selected application includes food, food preparation oils, viscous and/or beverage products.

In some embodiments, a method for manufacturing container 10 is provided. The method comprises the step of blow molding an article, for example, a preform (not shown), having a selected configuration having a body defining a volume, a neck and a dome. In some embodiments, during manufacturing, the preform is blow/molded in a blow molder (not shown). In some embodiments, the preform includes a selected configuration and is molded into an intermediate article, for example, an intermediate container (not shown) including the dome. In some embodiments, the method includes an HDPE or PET intermediate container manufactured via an extruder instead of being molded from a preform. See also, for example, the embodiments and disclosure of a container and method for manufacturing a container, shown and described in commonly owned and assigned U.S. patent application Ser. No. 17/527,548 filed Nov. 16, 2021, and published as U.S. Patent Application Publication No. 2023/0150184, on May 18, 2023, the entire contents of which being incorporated herein by reference. In some embodiments, the method includes thermoforming an intermediate container.

In some embodiments, the method comprises the step of trimming the intermediate container to remove the dome to form a finished container 10. In some embodiments, the intermediate container will travel through a trimmer (not shown) to remove the dome. In some embodiments, after the dome is removed, the method comprises the step of filling container 10 with food and/or beverage products at a fill site utilizing automated fill equipment, including, but not limited to an auger filling machine, a vibratory filler, a cup filler and/or a piston filler. In some embodiments, container 10 is manually filled by hand. In some embodiments, after container 10 is filled, the method comprises the step of attaching a closure, for example, a lid 28 to a neck 20 of container 10. In some embodiments, the method comprises the step of attaching a sleeve, for example, a shrink band 42 to an outer surface of lid 28 and neck 20. In some embodiments, shrink band 42 is attached to the outer surface of lid 28 and neck 20 via heat. The end product includes finished container 10, shown in FIGS. 1-14 where a projection 32, a gap 34 and a support 36 are configured to form a vent 38 such that when shrink band 42 engages and conforms to the outer surface of lid 28 and neck 20, container 10 can vent.

In some embodiments, support 36 includes a selected width that facilitates mold release during manufacture. In some embodiments, the width of support 36 is greater than a depth of support 36 to facilitate container 10 mold release during manufacture.

In some embodiments, methods of manufacturing, as described herein, can be employed with various types of plastic containers produced with a blown neck finish. In some embodiments, the method includes the step of reusing the dome to produce other containers. In some embodiments, the step of reusing the dome includes grinding, blending, drying and adding the dome and adding the ground, blended and dried material to a melt stream, wherein the dome does not contain additives.

In some embodiments, container 10 is vented as a safety feature so that gas from an interior of container 10 is released into the atmosphere prior to lid 28 being removed from container 10. In some embodiments, container 10 is vented to facilitate the escape of steam from the interior of container 10 and into the atmosphere when container 10 is filled with a hot product during manufacture. In some embodiments, a vacuum is formed between the exterior environment and into the interior volume of container 10 when container 10 is filled with a hot product during manufacture, and vent 38 equalizes the pressure between the exterior environment and the interior volume of container 10. In some embodiments, the food and/or beverage products are hot due to manufacturing and filling of the products. In some embodiments, container 10 is capable of maintaining an initial shape at an elevated pressure of greater than 3 pounds per square inch (psi) and withstands a vacuum draw of greater than 3 In Hg during filling of container 10 with hot food and/or beverage products.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A packaging container comprising:
  a body defining a volume, the body including a neck extending from an opening of the body,
  the neck including a proximal surface and a circumferential projection defining at least one gap, the neck further including at least one axial support disposed in the gap;
  a closure engageable with the proximal surface; and
  a sleeve conformable to an outer surface of the closure and the neck.

2. A packaging container as recited in claim 1, wherein the sleeve includes tamper evidence indicia.

3. A packaging container as recited in claim 2, wherein the indicia includes perforations.

4. A packaging container as recited in claim 1, wherein the sleeve includes a heat shrinkable material.

5. A packaging container as recited in claim 1, wherein the circumferential projection includes a horizontal projection.

6. A packaging container as recited in claim 5, wherein the horizontal projection is disposed on a transverse axis relative to a longitudinal axis of the body.

7. A packaging container as recited in claim 1, wherein the at least one axial support includes at least one vertical support.

8. A packaging container as recited in claim 7, wherein the at least one vertical support is disposed on a longitudinal axis relative to the body.

9. A packaging container as recited in claim 1, wherein the at least one support includes a first support and a second support.

10. A packaging container as recited in claim 1, wherein the circumferential projection defining the least one gap and the at least one axial support forms a vent.

11. A packaging container as recited in claim 10, wherein the vent is configured for passage of a pressurized gas from an interior volume of the container to an exterior environment of the container.

12. A packaging container as recited in claim 1, wherein the closure is engageable with the proximal surface in a snap configuration.

13. A blow molded packaging container comprising:
a body defining a volume, the body including a neck extending from an opening of the body,
the neck including a proximal surface and a horizontal circumferential projection defining at least one gap, the neck further including at least one vertical axial support disposed in the gap;
a snap closure engageable with the proximal surface; and
a tamper evidence sleeve conformable to an outer surface of the closure and the neck.

14. A packaging container as recited in claim 13, wherein the tamper evidence sleeve includes indicia including perforations.

15. A packaging container as recited in claim 13, wherein the tamper evidence sleeve includes a heat shrinkable material.

16. A packaging container as recited in claim 13, wherein the at least one support includes a first support and a second support.

17. A packaging container as recited in claim 13, wherein the horizontal circumferential projection defining the least one gap and the at least one vertical axial support forms a vent.

18. A method for manufacturing a packaging container, the method comprising the steps of:
blow molding an article having a selected configuration and including a body defining a volume, a neck and a dome, the neck including a proximal surface and a circumferential projection defining at least one gap, the neck further including at least one axial support disposed in the gap;
trimming the article to remove the dome to form a finished container;
attaching a closure to the proximal surface; and
attaching a sleeve to an outer surface of the closure and the neck.

19. A method as recited in claim 18, wherein the circumferential projection defining the least one gap and the at least one axial support forms a vent.

20. A method as recited in claim 18, wherein the vent is configured for passage of a pressurized gas from an interior volume of the container to an exterior environment of the container.

* * * * *